United States Patent
Wu et al.

(10) Patent No.: US 9,647,808 B2
(45) Date of Patent: May 9, 2017

(54) BANDWIDTH IN WIRELESS COMMUNICATIONS

(75) Inventors: Chao Wu, Beijing (CN); Peter Skov, Beijing (CN); Li Zhang, Beijing (CN); Timo Erkki Lunttila, Espoo (FI)

(73) Assignee: Nokia Solution and Networks Oy, Espoo (FI)

( * ) Notice: Subject to any disclaimer, the term of this patent is extended or adjusted under 35 U.S.C. 154(b) by 0 days.

(21) Appl. No.: 14/402,708

(22) PCT Filed: Jun. 11, 2012

(86) PCT No.: PCT/CN2012/076706
§ 371 (c)(1),
(2), (4) Date: Nov. 21, 2014

(87) PCT Pub. No.: WO2013/185274
PCT Pub. Date: Dec. 19, 2013

(65) Prior Publication Data

US 2015/0172017 A1    Jun. 18, 2015

(51) Int. Cl.
*H04L 5/00*  (2006.01)
*H04W 88/08* (2009.01)

(52) U.S. Cl.
CPC ............ *H04L 5/0039* (2013.01); *H04L 5/001* (2013.01); *H04L 5/0005* (2013.01); *H04L 5/0064* (2013.01); *H04L 5/0023* (2013.01); *H04L 5/0037* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2011/0103243 A1* | 5/2011 | Larsson | H04L 5/001 370/252 |
| 2011/0267978 A1 | 11/2011 | Etemad | |
| 2011/0275335 A1* | 11/2011 | Luo | H04W 52/281 455/127.1 |

(Continued)

FOREIGN PATENT DOCUMENTS

| | | |
|---|---|---|
| CN | 102036401 A | 4/2011 |
| WO | 2010088970 | 8/2010 |

OTHER PUBLICATIONS

Ericsson, "Supported Bandwidth Combinations for Inter-Band and Intra-Band Carrier Aggregation".*

(Continued)

*Primary Examiner* — Andrew Lai
*Assistant Examiner* — Jamaal Henson
(74) *Attorney, Agent, or Firm* — Harrington & Smith

(57) ABSTRACT

Definition of a combined bandwidth is disclosed. Bandwidths for components of a combined bandwidth can be defined by selecting configurations for the bandwidths from a group of available bandwidth configurations. The bandwidths are combined to define a contiguously combined bandwidth in a resource block unit. At least one set of coefficients corresponding to the available bandwidth configurations are used. The contiguously combined bandwidth shall not exceeds a predefined maximum bandwidth. A transmission bandwidth can be defined. A channel bandwidth can be defined based on the defined transmission bandwidth.

18 Claims, 5 Drawing Sheets

(56) References Cited

U.S. PATENT DOCUMENTS

| | | | |
|---|---|---|---|
| 2012/0281667 A1* | 11/2012 | Chang | H04L 5/001 370/329 |
| 2013/0176952 A1* | 7/2013 | Shin | H04L 5/001 370/329 |
| 2013/0188591 A1* | 7/2013 | Ko | H04B 7/0626 370/329 |

OTHER PUBLICATIONS

3GPP TSG RAN WG1 Meeting #55, Prague, Czech Rep., Nov. 10-14, 2008, R1-084346, "Carrier aggregation in LTE-Advanced", Huawei, 6 pgs.

TSG-RAN Working Group 4 (Radio) meeting #52, Shenzhen, China, Aug. 24-28, 2009, R4-093390, "Updated TR: LTE-Advanced RAN4 feasibility studies TR 36.912: Common requirements for UE and BS, Carrier Aggregation", Ericsson, ST-Ericsson, Deutsche Telekom AG, 3 pgs.

3GPP TSG-RAN WG4 Meeting #63, Prague, Czech Republic, May 21-25, 2012, R4-122845, "Supported bandwidth combinations for intra-band and inter-band carrier aggregation", Ericsson, ST-Ericsson, 5 pgs.

\* cited by examiner

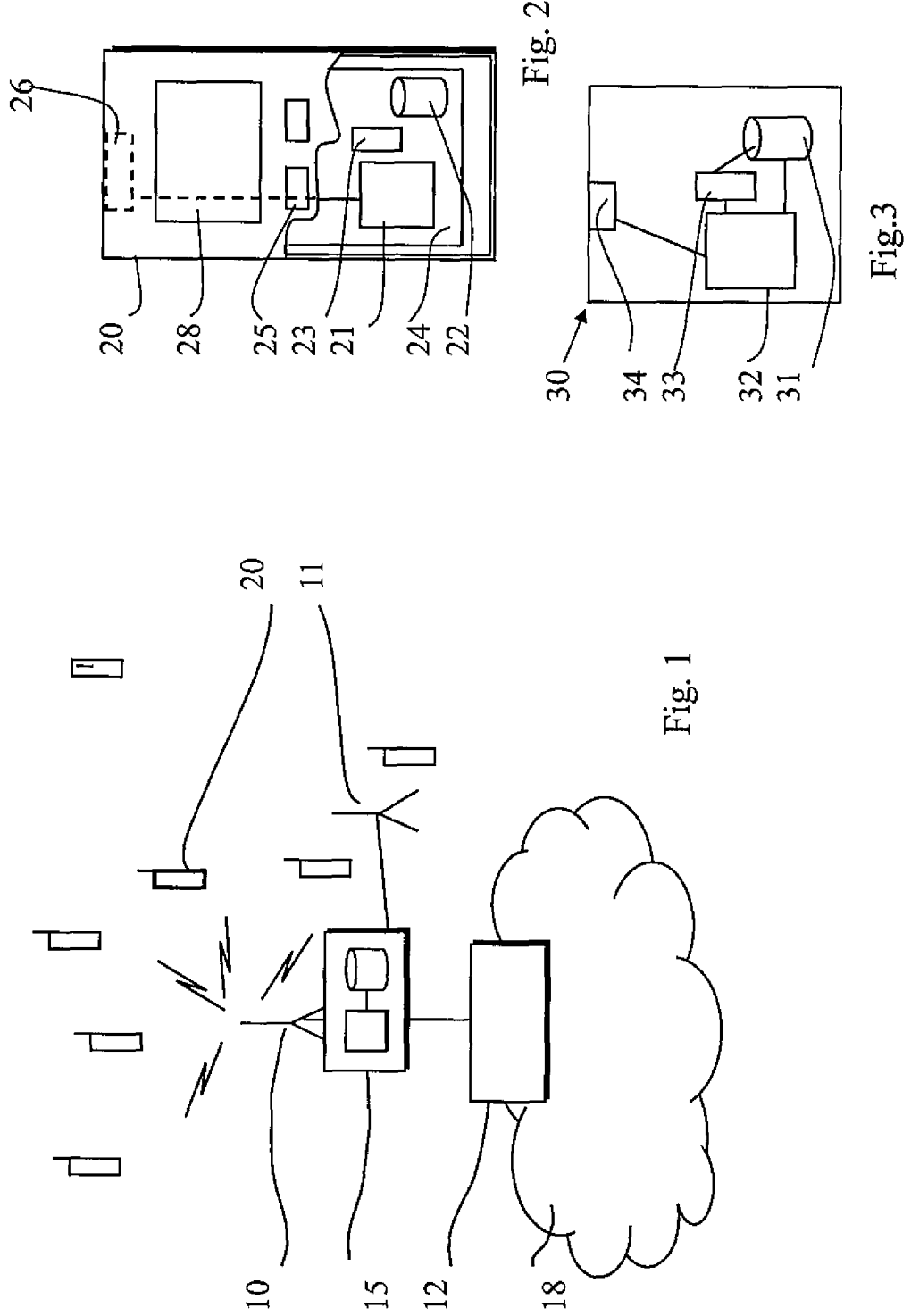

BANDWIDTH IN WIRELESS COMMUNICATIONS

This disclosure relates to wireless communications and more particularly to providing bandwidth for wireless communications.

Communication sessions on wireless carriers can be provided between two or more nodes such as fixed or mobile devices capable of wireless communications, access nodes such as base stations, servers, machine type terminals and so on. A communication system and compatible communicating entities typically operate in accordance with a given standard or specification which sets out what the various entities associated with the system are permitted to do and how that should be achieved. For example, the standards, specifications and related protocols can define how various nodes shall communicate, how various aspects of the communications shall be implemented and how the communicating nodes shall be configured.

Examples of wireless systems include public land mobile networks (PLMN) such as cellular networks, satellite based communication systems and different wireless local networks, for example wireless local area networks (WLAN). Wireless systems can be divided in coverage areas typically referred to as cells. A cell can be provided by a base station, there being various different types of base stations. A base station system may provide a plurality of cells. Different types of cells can provide different features. For example, cells can have different shapes, sizes and other characteristics. An example of cellular communication systems is an architecture based on standards by the 3rd Generation Partnership Project (3GPP). Recent development of the 3GPP architecture is the long-term evolution (LTE) of the Universal Mobile Telecommunications System (UMTS) radio-access technology. A further development of the LTE is often referred to as LTE-Advanced. The various development stages of the 3GPP LTE specifications are referred to as releases.

A user can access a communication system by means of an appropriate communication device. A communication device is provided with an appropriate signal receiving and transmitting arrangement for enabling communications with other parties. In wireless or mobile systems a communication device provides a transceiver station that can communicate over an air interface. The communication device may access carriers provided by nodes such as base stations, other communications devices and so on, and transmit and/or receive communications on the carriers. A node may communicate simultaneously on a plurality of carriers.

An issue in the context of mobile and more generally wireless broadband is increasing demand for capacity for data traffic. This is due to the increase in number of wireless devices and various applications with demand for high data rates. A possible approach to address the higher demand is to have larger bandwidths. However, this comes with its own challenges. Use of larger bandwidths for example in the LTE can be challenging already because there is still a large number of existing bands that do no originate from the LTE based systems. The old bands are typically partitioned to various different bandwidths, thus making use thereof complicated and often inefficient.

Refarming is a possible technique available for network operators to increase the bandwidth in instances where the existing bands are not appropriate. Refarming can be used for example when the existing bands are not designed for LTE and/or its later developments. However, refarming may not produce an appropriate configuration to match with the existing bands. Operators are likely to deploy LTE on many band holdings, and thus it is likely that they experience mismatching problem between LTE bandwidth designs and legacy bandwidth designs. This can be so because of crude and limited bandwidth granularity. Also, although more bandwidth could be introduced, it can be hard to meet all different deployment needs.

Good spectral efficiency would nevertheless be desired. Normalization of bandwidth over available bandwidth resource is likely to show undesirably low spectral efficiency because the available bandwidth resource is typically more than the channel bandwidth size that can be used. For example, the currently defined LTE bandwidths do not always match well with the bandwidth a given operator happens to have. For example, an operator having 11 MHz of spectrum may use this for a 10 MHz LTE carrier, and hence some of the spectrum will become unutilized.

New carrier type(s) may be introduced to enhance spectral efficiency. It has been proposed that a new carrier type should be associated with a backward compatible carrier. Also, a new carrier type should support both synchronous and non-synchronous scenarios. This however can add to inefficiencies. Limited choice of bandwidths can counteract most of the accumulated spectral gain from the additional carrier.

For example, 3GPP defines six possible transmission bandwidth configurations, see FIG. 6 for Evolved Universal Terrestrial Radio Access (E-UTRA) channel bandwidths. For an operating band, transmission bandwidth and channel bandwidth can only be chosen from these six types of size. A difference can emerge between the practical band resource requirement and the limited types because of various factors in determining the size of an operating band. For example, different national policies, regional policies, auction assignments and so could play their part in here.

Granularity of these options is nonlinearly distributed which often makes the gap generated after planning to seem large. The vacant part can affect capacity.

For example, current 3GPP LTE specifications set an upper limit in the transmission/channel bandwidth. The transmission bandwidth is limited at 100 physical resource blocks (PRB) and channel bandwidth at 20 MHz. On the other hand, e.g. the International Telecommunications Union (ITU) has set a requirement of providing at least 40 MHz bandwidth. Also, a user equipment transceiver is typically capable of having the capability to send and receive more than 100 PRBs. Thus the limit can become a bottleneck in LTE. It is evident that the high throughput requirement would motivate better use and high efficiency of frequency resources.

LTE Release 10 attempts to meet the requirement by internal and external carrier aggregation (CA). Carrier aggregation is a technique that provides bandwidth expansion, in particular for the upper limit of bandwidth bottleneck. However, CA introduces a gap between the carrier components. This degrades spectral efficiency. The carrier components are independently processed in baseband and contiguous allocation across the carrier components for flexible scheduling brings on issues such as time/frequency synchronization, radio frequency cubic metric (RF CM), cost, etc.

Although carrier aggregation (CA) increases peak data rates and throughput by aggregating channel bandwidth, each carrier component still can be only one of the six bandwidth choices. Thus the gaps between adjacent component carriers' transmission bandwidth edge still decrease spectral efficiency. More component carriers (CC) mean more gaps, more synchronization issues and larger power consumption. The CCs are processed discontinuously which generate many implementation issues in both RF and baseband.

It is noted that the above discussed issues are not limited to any particular communication environment, but may occur in any appropriate communication system where a combined used of a multiple of bandwidths may be provided.

Embodiments of the invention aim to address one or several of the above issues.

According to an aspect, there is provided a method for defining bandwidth, comprising determining bandwidths for components of a combined bandwidth, where configurations for the bandwidths are selected from a group of available bandwidth configurations, and combining the bandwidths to define a contiguously combined bandwidth in a resource block unit using at least one set of coefficients corresponding to the available bandwidth configurations, the contiguously combined bandwidth not exceeding a predefined maximum bandwidth.

The defining can comprise defining a combined transmission bandwidth.

According to another aspect, there is provided a method for defining channel bandwidth, comprising determining instances for combined transmission bandwidths from component bandwidths to define contiguously combined transmission bandwidths, where configurations for the component bandwidths are selected from a group of available bandwidth configurations and the instances for combined transmission bandwidths are scaled by applying coefficients to provide contiguous combined transmission bandwidths, and deriving a channel bandwidth for a resource block unit based on the determined contiguously combined transmission bandwidths.

According to another aspect, there is provided an apparatus for wireless communications, the apparatus comprising at least one processor, and at least one memory including computer program code, wherein the at least one memory and the computer program code are configured, with the at least one processor, to determine configurations for component bandwidths from a group of available bandwidth configurations, and combine component bandwidths to define a contiguously combined transmission bandwidth in a resource block unit using at least one set of coefficients corresponding to available bandwidth configurations and ensuring that the contiguously combined transmission bandwidth does not exceed a predefined maximum bandwidth.

According to yet another aspect, there is provide an apparatus for wireless communications, the apparatus comprising at least one processor, and at least one memory including computer program code, wherein the at least one memory and the computer program code are configured, with the at least one processor, to determine instances for combined transmission bandwidths from component bandwidths defining contiguously combined transmission bandwidths based on selection of configurations for the component bandwidths from a group of available bandwidth configurations and scaling of the instances for combined transmission bandwidths by applying coefficients to provide contiguous combined transmission bandwidths, and derive a channel bandwidth for a resource block unit based on the determined contiguously combined transmission bandwidths.

According to a more detailed aspect, defining of a combined bandwidth $N_{RB}$ is based on where k1, k2, k3, k4, k5, k6 are integer coefficients ≥0 each corresponding to a physical resource block configuration within an existing channel bandwidth and transmission bandwidth.

Scaling may be applied to at least one parameter. The scaling may comprise use of a target parameter specified for each available transmission bandwidth. A maximum or minimum value of possible coefficients may be selected as the target parameter. At least one parameter can remain the same.

Proprietary coefficients may be defined.

Information about coefficient used by a network element can be signalled to at least one mobile device and/or network element.

Each coefficient kx of a set of coefficients may be varied from 0 to $$\left\lfloor \frac{N_{RBMax}}{kx_{RB}} \right\rfloor,$$

where $N_{RBMax}$ denotes the predefined maximum bandwidth, and $kx_{RB}$ denotes transmission bandwidth corresponding to kx. Valid instances of the combined bandwidth and related sets of coefficients may be generated based thereon. The valid instances can be indexed in a table.

A node such as a base station and/or a controller thereof or a mobile device can be configured to operate in accordance with the various embodiments.

A computer program comprising program code means adapted to perform the method may also be provided.

It should be appreciated that any feature of any aspect may be combined with any other feature of any other aspect.

Embodiments will now be described in further detail, by way of example only, with reference to the following examples and accompanying drawings, in which:

FIG. 1 shows a schematic diagram of a communication system;

FIG. 2 shows a schematic diagram of a mobile communication device;

FIG. 3 shows a schematic diagram of a control apparatus;

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the described examples.

A communication device 20 is typically provided wireless access via at least one base station or similar wireless transmitter and/or receiver node of an access system. In FIG. 1 two stations 10 and 11 provide overlapping radio service areas serving the mobile communication device. It is noted that instead of two stations and/or cells, any number of stations can be provided in a communication system. Each communication device and base station may have one or more radio channels open at the same time and may send signals to and/or receive signals from more than one source Base stations are typically controlled by at least one appropriate controller apparatus so as to enable operation thereof and management of mobile communication devices in communication with the base stations. FIG. 1 shows control apparatus 15 for control of the two stations 10 and 11. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments at least a part of control apparatus may be respectively provided in each base station.

A non-limiting example of the recent developments in communication system architectures is the long-term evolution (LTE) of the Universal Mobile Telecommunications System (UMTS) that is being standardized by the 3rd Generation Partnership Project (3GPP). As explained above, further development of the LTE is referred to as LTE-Advanced. The LTE employs a mobile architecture known as the Evolved Universal Terrestrial Radio Access Network (E-UTRAN). Base stations or base station systems of such architectures are known as evolved or enhanced Node Bs (eNBs). An eNB may provide E-UTRAN features for cells such as user plane Radio Link Control/Medium Access Control/Physical layer protocols (RLC/MAC/PHY) and control plane Radio Resource Control (RRC) protocol terminations towards the communication devices. Other examples of radio access include those provided by base stations of systems that are based on technologies such as wireless local area network (WLAN) and/or WiMax (Worldwide Interoperability for Microwave Access).

Figure 7:
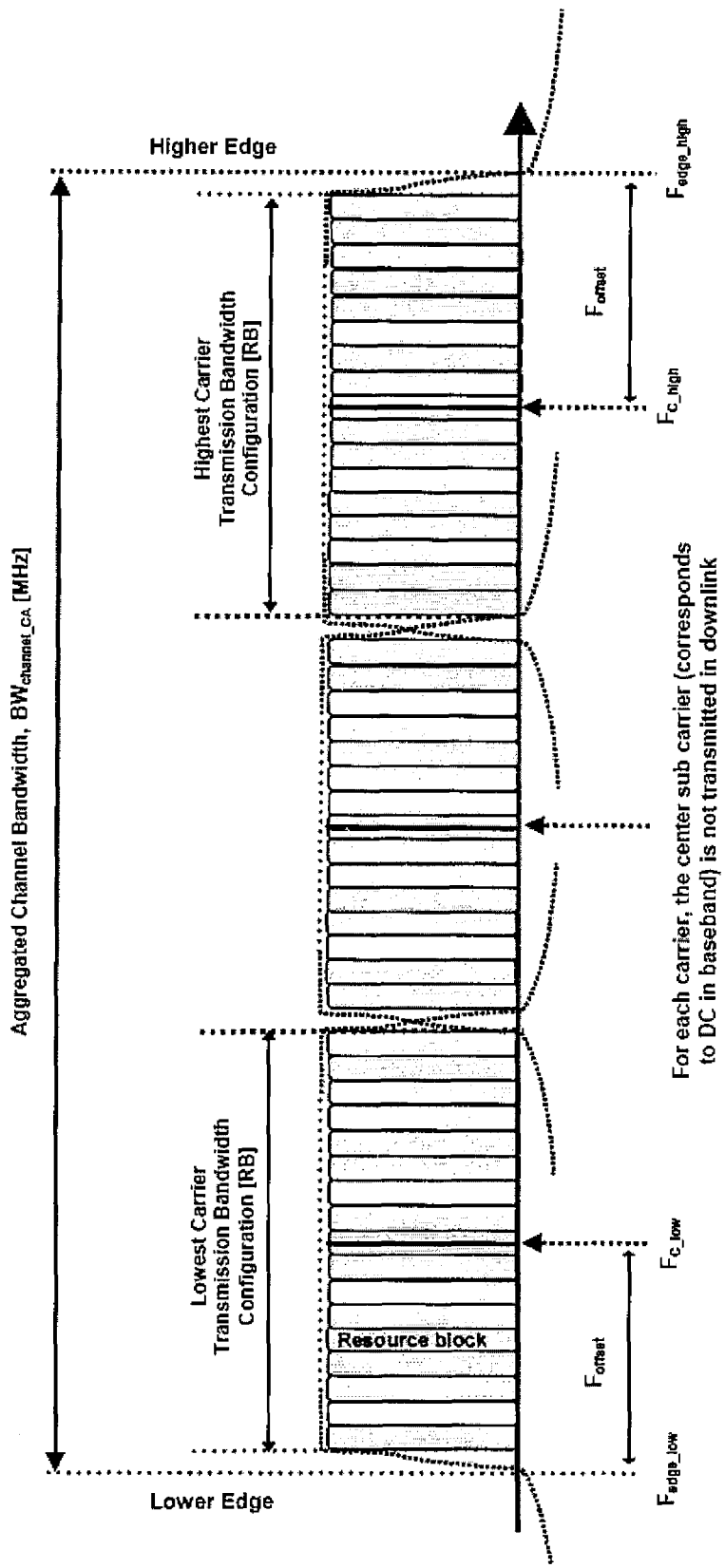

Carrier aggregation or cell aggregation can be used to increase performance. An example of carrier aggregation is shown in FIG. 7. In carrier aggregation a plurality of component carriers on different frequencies are aggregated to increase bandwidth. In cell aggregation a plurality of cells can provide a plurality of carriers. Cell aggregation can be understood as an intra-frequency inter-site combination, a difference to carrier aggregation being that carrier aggregation is provided over multiple frequencies whereas cell aggregation can be provided on a single carrier resource, such as on a single frequency band. Therefore cell aggregation requires different capability from the communication device to that of carrier aggregation. For example, a cell aggregation capable radio may need to support one frequency only. Cell aggregation can utilize the current carrier aggregation features to support a flexible and powerful solution. In cell aggregation one of the cells may provide a primary cell whereas the other cell or cells can provide at least one secondary cell.

A possible mobile communication device for communication with a plurality of base stations will now be described in more detail with reference to FIG. 2 showing a schematic, partially sectioned view of a communication device 20. Such a communication device is often referred to as user equipment (UE) or terminal. An appropriate mobile communication device may be provided by any device capable of sending radio signals to and/or receiving radio signals from multiple cells. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile device may send and/or receive signals to/from a multiple of stations over an air interface via appropriate apparatus for receiving and may transmit signals via appropriate apparatus for transmitting radio signals. In FIG. 2 transceiver apparatus is designated schematically by block 26. The transceiver apparatus 26 may be provided for example by means of a radio part and associated antenna arrangement. The antenna arrangement may be arranged internally or externally to the mobile device.

A mobile communication device is also provided with at least one data processing entity 21, at least one memory 22 and other possible components 23 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 24.

The user may control the operation of the mobile device by means of a suitable user interface such as key pad 25, voice commands, touch sensitive screen or pad, combinations thereof or the like. A display 28, a speaker and a microphone can be also provided. Furthermore, a mobile communication device may comprise appropriate connectors (either wired or wireless) to other devices and/or for connecting external accessories, for example hands-free equipment, thereto.

FIG. 3 shows an example of a control apparatus for a communication system, for example to be coupled to and/or for controlling one or more stations. It is noted that in some embodiments each station comprises a separate control apparatus that may communicate control data with each other. The control apparatus 30 can be arranged to provide control on communications in the service area of the system. The control apparatus 30 can be configured to provide control functions in association with providing combined bandwidth e.g. by means of carrier aggregation by means of data processing facility in accordance with certain embodiments described below. For this purpose the control apparatus comprises at least one memory 31, at least one data processing unit 32, 33 and an input/output interface 34. Via the interface the control apparatus can be coupled to a receiver and a transmitter of the base station. The control apparatus can be configured to execute an appropriate software code to provide the control functions. It shall be appreciated that similar component can be provided in a control apparatus provided elsewhere in the system for controlling reception of sufficient information for decoding of received information blocks.

A wireless communication device, such as a mobile station or a base station, can be provided with a Multiple Input/Multiple Output (MIMO) antenna system. MIMO arrangements as such are known. MIMO systems use multiple antennas at the transmitter and receiver along with advanced digital signal processing to improve link quality and capacity. The transceiver apparatus 26 of FIG. 2 can provide a plurality of antenna ports. More data can be received and/or sent where there are more antennae elements.

Figure 8:
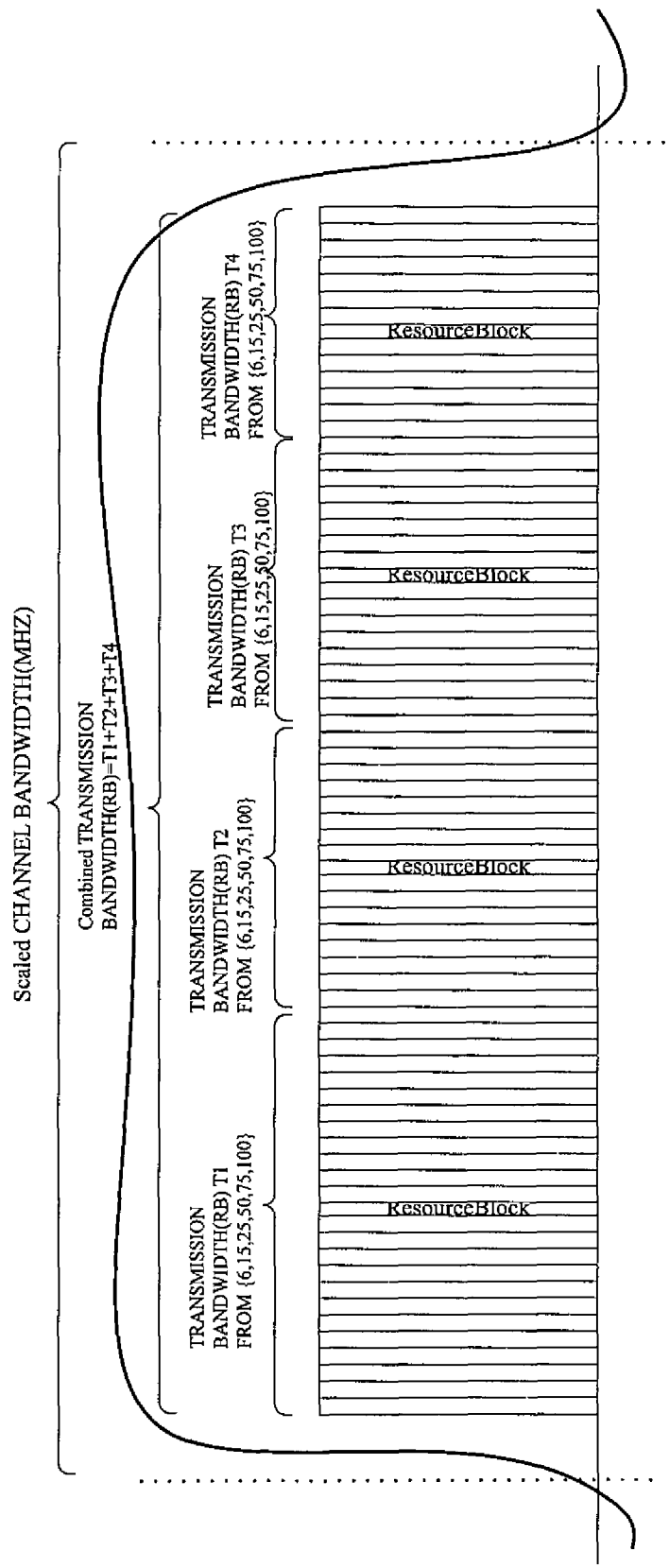
FIG. 8 shows a combined bandwidth patent according to an embodiment.

The following describes certain exemplifying embodiments where a combination of existing bandwidths with multiple component carriers is provided a contiguously combined bandwidth carrier such that there are no gaps between the combined component carriers (CCs). The inventors have realised that there is no particular reason why LTE carriers could not be deployed closer to each other to avoid the gaps, other than that the UE operation might become unspecified. Consider that in LTE the carrier frequency raster is 300 kHz. Also, the gaps are currently used because e.g. in 3GPP LTE standard user equipment requirements are specified based on the gaps. As the subcarrier spacing is 15 kHz, so with 300 kHz carrier raster even the adjacent CC subcarriers remain orthogonal. New transmission bandwidths can thus be defined as a linear combination of the existing LTE bandwidths meaning that the new transmission bandwidths can be realized by fully contiguous aggregation of existing system bandwidths, with no guard bands there between, as shown in FIG. 8.

Figure 4:
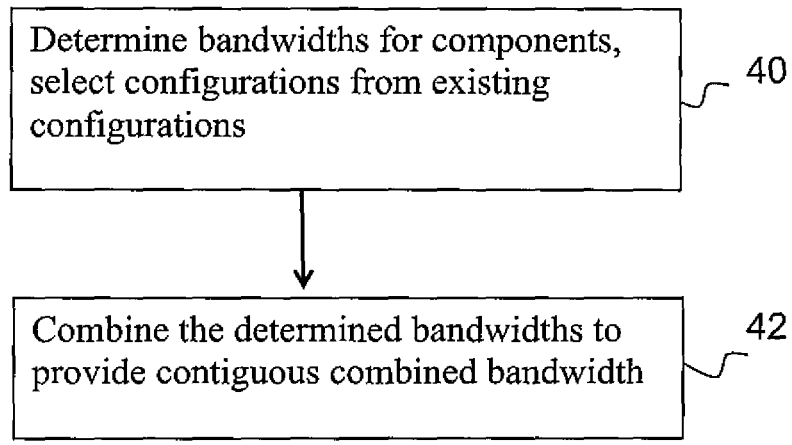
FIGS. 4 and 5 shows schematic flowcharts according to certain embodiments.
Figure 6:
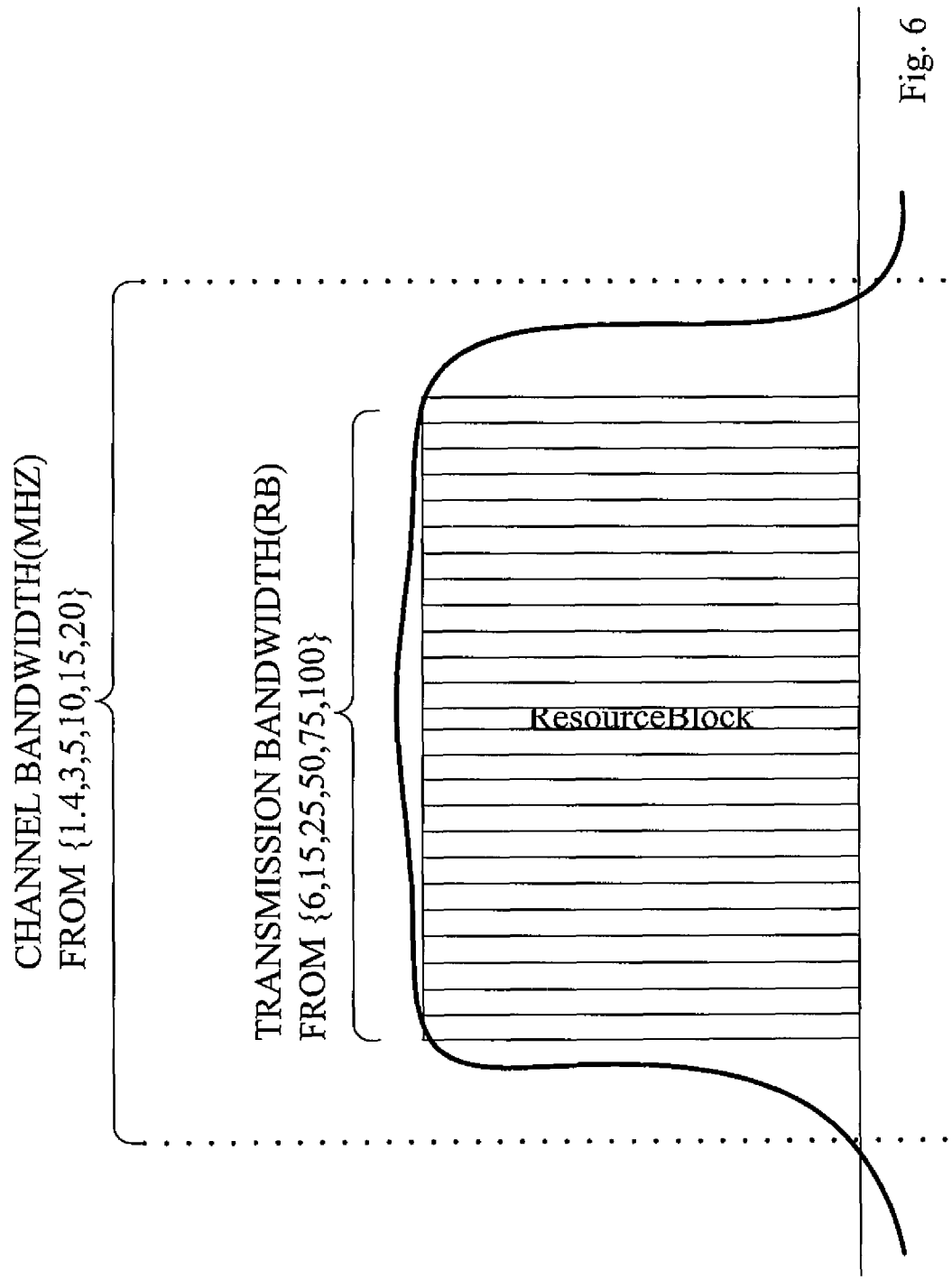
FIGS. 6 and 7 show current bandwidth patterns.

Flowchart of FIG. 4 shows a method for defining continuous combined bandwidth. Bandwidths for components of a combined transmission bandwidth are determined at 40. At this stage configurations for the bandwidths are selected from a group of available bandwidth configurations, for example from the six configurations available in LTE (for these configurations, see FIGS. 6 and 8). At 42 the determined bandwidths are combined to define a contiguously combined transmission bandwidth in a resource block unit. At this stage a set of coefficients corresponding to available bandwidth configurations are used to combine a contiguous transmission bandwidth. In combining a check can be made that the contiguously combined transmission bandwidth defined does not exceed a predefined maximum bandwidth.

Figure 5:
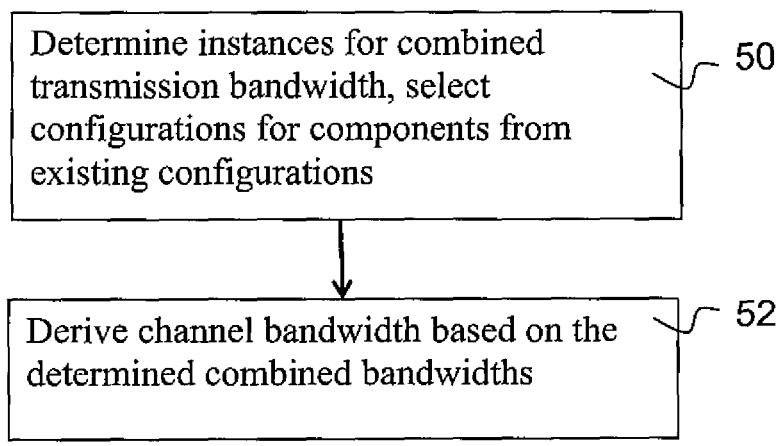

Flowchart of FIG. 5 shows a method for defining transmission bandwidth and channel bandwidth. Instances for combined transmission bandwidth are determined from component bandwidths at 50 to define contiguously combined transmission bandwidths. It can be checked that these do not exceed a predefined maximum bandwidth. Configurations for the component bandwidths are selected from a group of available bandwidth configurations, and then the configurations are scaled by applying a set of coefficients. The instances for combined transmission bandwidth are scaled by using an appropriate scaling method in accordance with operator requirements and the configurations. A channel bandwidth can then be derived at 52 for a resource block unit based on the determined contiguously combined transmission bandwidths.

In the following an example of providing bandwidth scalability is described in greater detail. An example of adaptively combined bandwidth is shown in FIG. 8.

In accordance with an embodiment an upper limit for transmission bandwidth is set up in a resource block (RB) unit. This parameter defining the maximum bandwidth is noted below as $N_{RBMax}$.

A new transmission bandwidth can be defined for a target operation band or a new carrier component of a carrier aggregation (CA) set in a physical resource block (PRB) unit as follows:

$$N_{RB} = k1*6 + k2*15 + k3*25 + k4*50 + k5*75 + k6*100$$

Where:
$N_{RB}$ is the new defined transmission bandwidth which should not exceed $N_{RBMax}$, and
k1, k2, k3, k4, k5, k6 are non-negative integer coefficients, each corresponding to a PRB configuration within existing channel bandwidth (e.g. 1.4M, 10M, etc) and transmission bandwidth (6 RBs, 50 RBs, etc).

The coefficient set (k1, k2, k3, k4, k5, k6) for a transmission bandwidth $N_{RB}$ can be noted as CS to $N_{RB}$ (Coefficient Set for a new generated transmission bandwidth).

An element in the coefficient set can generally be noted as kx.

Transmission bandwidth corresponding to kx can generally be noted as $kx_{RB}$.

By varying each coefficient element kx from 0 to $$\left\lfloor \frac{N_{RBMax}}{kx_{RB}} \right\rfloor,$$

it is possible to generate valid instances of $N_{RB}$ and a related coefficient set (CS) based on the above formula and the precondition ($N_{RB} \leq N_{RBMax}$). All valid outcomes and related coefficient set(s) CS can be indexed in a table $DRB_{table}$ with index parameter $DRB_{idx}$. When a mobile device, for example a LTE capable UE, needs to know the coefficient(s) a network node such as an eNB is using to derive its PHY/MAC processing parameters, the device can be notified of the coefficient set information by means of the index parameter.

Channel bandwidth of the newly derived transmission bandwidth can be derived by means of an appropriate scaling procedure and indexes in the table $DRB_{table}$ with $DRB_{idx}$ corresponding to the transmission bandwidth. In accordance with a possible scaling method each kx is multiplied within one coefficient set (CS) by the target parameter specified for each $kx_{RB}$ and these are summed up. The result is scaled with a scaling factor defined in a proprietary way so that target parameter for the new bandwidth $N_{RB}$ can be derived. The scaling parameter may be e.g. the sampling rate. Some other possible scaling methods are described later in this description.

A practical transmission bandwidth and channel bandwidth deployment scheme can be selected as one indexed item from a table $DRB_{table}$.

Scaling methods can be applied to appropriate channel bandwidth/transmission bandwidth dependent parameters and related parameters for devices such as an eNB and/or UE. Also, relevant signaling can be generated for an eNB and/or UE and appropriate apparatus provided for handling the signaling at these entities.

For a specific requirement or regulatory rules in radio frequency (RF) part, a parameter such as a Network Signaling Value (NS x) may be used to address the specific condition.

For a carrier aggregation (CA) deployment other carrier component(s) of a CA set can be defined and the configuration distributed as described above.

The above scheme can be readily applied for the uplink (UL) in the 3GPP as both the signal and channel bandwidth are controlled by a control apparatus in the network side. For example, the control can apparatus can be provided in association with an enhanced NodeB (eNB). Mobile device bandwidth can be managed by proprietary means. A network entity such as an eNodeB (eNB) can be provided with a wide knowledge of the newly defined bandwidth, and can use this information to derive required parameters, user scheduling, and so on. For example, an eNodeB can control uplink (UL) bandwidth by simply by scheduling UL signals (e.g. physical uplink control channel; PUCCH and physical uplink shared channel; PUSCH etc.) on a contiguous subset of the entire channel bandwidth.

For downlink (DL), reference signals and DL control channels can be transmitted spanning the whole carrier bandwidth. Transmission bandwidth of DL control channels and signals may need update from the current specifications. In accordance with a possible scheme, a new transmission bandwidth and relevant information is added in the master information block (MIB) and system information block (SIB). The information can be signaled e.g. from an eNB to at least one mobile device and/or another eNB. For older user equipment, for example those compliant with LTE release 8/9/10, the baseband processing may be updated to adapt to the change. For user equipment where update is not feasible reference signal (RS) and control channel can be transmitted over the central legacy bandwidth to avoid edges where there no longer are any guard periods provided by the gaps.

According to a possibility new DL signaling is used. For example, a channel such as enhanced physical downlink control channel (ePDCCH) or cross scheduling can be used to setup non-backward compatible scheme to support new upgraded bandwidth. ePDCCH is a recent development of the LTE and is designed to improve control channel performance. ePDCCH may be in particular useful in connection with arrangements such as coordinated multipoint (COMP), DL multiple input multiple output (MIMO), heterogeneous networks (HetNet) and carrier aggregation, including use of extension carriers.

In the following further examples possible scaling methods are discussed. The below scaling methods can be used for channel bandwidth/transmission bandwidth dependent parameters by a network node such as an eNB or a mobile device such as a user equipment to derive corresponding values/scope.

In accordance with a possible method some of the parameters can be kept the same as the existing bandwidth configuration parameters and correspond to any coefficient element in a coefficient set with regards to existing requirement in related operating band. Thus update/scaling may not be necessary when a parameter is not changed when a new bandwidth is applied. For example, parameter such as subcarrier distance, UL/DL configuration, transmitter Off power level and so on may remain unchanged.

In accordance with another method maximum/minimum value amongst all coefficient elements in a coefficient set is selected as the target parameter value with regards to existing requirement in related operating band. For example, when different determined bandwidth configurations have their own parameters specified, then the maximum value/minimum value is selected for the newly generated bandwidth configuration. An example of an appropriate parameter for this is unwanted emission limit.

In accordance with a possibility proprietary coefficients are defined. The proprietary coefficients may be based on target parameters' characteristics. The proprietary coefficients are multiplied by the target parameter specified for each kx and summed up. The result is scaled with a scaling factor defined so that target parameter for the new bandwidth $N_{RB}$ can be derived. For example, s scaling factor based on fast fourier transform size can be used.

The embodiments can be used to provide a flexible bandwidth generation scheme to adapt to various real world deployment requirements and legacy operation band refarming. Also, increase in spectral efficiency over the operation band may be enabled. This is possible also elsewhere than within a fixed channel bandwidth. This may make it possible for an operator to have a smooth transition from earlier stage bands to newer bands. On the other hand, new operators can adjust the bandwidth and provide better service according to the practical data throughput requirement and scenarios without restriction within the original bandwidth assignment.

In current bandwidths gaps between adjacent bandwidth sizes may in certain occasions proportionally increase with the bandwidth size. Using scalable bandwidths different bandwidth sizes can be combined so that gaps between large bandwidth sizes become significantly constricted. This allows an operator to have a smaller bandwidth granularity and can assist in better matching real life requirements, such as e.g. a step size of six PRBs.

Certain embodiments can significantly simplify processing and time/frequency synchronization in context of carrier aggregation and correspondingly unified processing.

In cross-cell scheduling more available possible chances can become available for adjusting scheduling of bandwidth to a user. This can be used to mitigate interference and/or provide a better cell-edge coverage and throughput.

The required data processing apparatus and functions of a station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

It is noted that whilst embodiments have been described in relation to LTE-Advanced, similar principles can be applied to any other communication system or indeed to further developments with LTE. Also, instead of carriers between one or more base stations and a mobile device carriers may be provided between communication devices such as mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

What is claimed is:

1. A method for defining bandwidth, comprising:
   determining, by an enhanced NodeB of a wireless network, bandwidths for components of a combined bandwidth, where configurations for the bandwidths are selected from a group of available bandwidth configurations;
   combining the bandwidths to define a contiguously combined bandwidth in a resource block unit using at least one set of coefficients corresponding to the available bandwidth configurations, the contiguously combined bandwidth not exceeding a predefined maximum bandwidth;
   applying scaling to at least one parameter, wherein the scaling comprises using a target parameter specified for each available transmission bandwidth;
   signalling, by the enhanced NodeB, information associated with the combining of bandwidths, to at least one of: a mobile device and another enhanced NodeB; and
   communicating with a mobile device of the wireless network based at least on the information.

2. The method according to claim 1, comprising defining a combined transmission bandwidth.

3. The method according to claim 1, comprising:
   defining proprietary coefficients, and
   signalling the proprietary coefficients to at least one mobile device and/or network element.

4. The method according to claim 1, comprising:
   varying each coefficient kx of the set of coefficients from 0 to $$\left\lfloor \frac{N_{RBMax}}{kx_{RB}} \right\rfloor,$$

where:
   $N_{RBMax}$ denotes the predefined maximum bandwidth, and
   $kx_{RB}$ denotes transmission bandwidth corresponding to kx; and
   generating valid instances of the combined bandwidth and related sets of coefficients.

5. The method according claim 4, comprising indexing the valid instances of the combined bandwidth and the related sets of coefficients in a table.

6. The method according to claim 5, comprising providing a mobile device with information regarding at least one coefficient used by communicating information of at least one index.

7. A non-transitory memory comprising a computer program configured to cause a device to perform the method of claim 1 when the computer program is run on a processor.

8. A method for defining channel bandwidth, comprising:
   determining instances for combined transmission bandwidths from component bandwidths to define contiguously combined transmission bandwidths, where configurations for the component bandwidths are selected from a group of available bandwidth configurations and the instances for combined transmission bandwidths are scaled by applying coefficients to provide contiguous combined transmission bandwidths;
   deriving a channel bandwidth for a resource block unit based on the determined contiguously combined transmission bandwidths; and
   signalling, by the enhanced NodeB, information associated with the combining of bandwidths, to at least one of: a mobile device and another enhanced NodeB; and
   communicating with a mobile device of the wireless network based at least on the information.

9. The method according to claim 1, comprising defining a combined bandwidth $N_{RB}$ based on $$N_{RB}=k1*6+k2*15+k3*25+k4*50+k5*75+k6*100$$

where k1, k2, k3, k4, k5, k6 are integer coefficients $\geq 0$ each corresponding to a physical resource block configuration within an existing channel bandwidth and transmission bandwidth.

10. The method according to claim 8, comprising defining a combined bandwidth $N_{RB}$ based on $$N_{RB}=k1*6+k2*15+k3*25+k4*50+k5*75+k6*100$$

where k1, k2, k3, k4, k5, k6 are integer coefficients $\geq 0$ each corresponding to a physical resource block configuration within an existing channel bandwidth and transmission bandwidth.

11. The method according to claim 8, comprising:
    defining proprietary coefficients, and
    signalling the proprietary coefficients to at least one mobile device and/or network element.

12. The method according to claim 8, comprising:
    varying each coefficient kx of the set of coefficients from 0 to $$\left\lfloor \frac{N_{RBMax}}{kx_{RB}} \right\rfloor,$$

where:
    $N_{RBMax}$ denotes the predefined maximum bandwidth, and
    $kx_{RB}$ denotes transmission bandwidth corresponding to kx; and
    generating valid instances of the combined bandwidth and related sets of coefficients.

13. An apparatus for wireless communications, the apparatus comprising at least one processor, and at least one memory including computer program code, wherein the at least one memory and the computer program code are configured, with the at least one processor, to:

determine, by an enhanced NodeB, configurations for component bandwidths from a group of available bandwidth configurations;

combine component bandwidths to define a contiguously combined transmission bandwidth in a resource block unit using at least one set of coefficients corresponding to available bandwidth configurations and ensuring that the contiguously combined transmission bandwidth does not exceed a predefined maximum bandwidth;

apply scaling to at least one parameter, wherein the scaling comprises using a target parameter specified for each available transmission bandwidth; and signal, by the enhanced NodeB, information associated with the combining of bandwidths, to at least one of: a mobile device and another enhanced NodeB;

communicate with a mobile device of the wireless network based at least on the information.

14. The apparatus according to claim 13, configured to define a combined bandwidth $N_{RB}$ based on $$N_{RB}=k1*6+k2*15+k3*25+k4*50+k5*75+k6*100$$

where k1, k2, k3, k4, k5, k6 are integer coefficients ≥0 each corresponding to a physical resource block configuration within an existing channel bandwidth and transmission bandwidth.

15. The apparatus according to claim 13, configured to define proprietary coefficients and cause signalling of the proprietary coefficients to at least one mobile device and/or network element.

16. The apparatus according to claim 13, configured to vary each coefficient kx of a set of coefficients from 0 to $$\left\lfloor \frac{N_{RBMax}}{kx_{RB}} \right\rfloor,$$

where $N_{RBMax}$ denotes the predefined maximum bandwidth, and $kx_{RB}$ denotes transmission bandwidth corresponding to kx, and generate valid instances of the combined bandwidth and related sets of coefficients.

17. The apparatus according to any of claim 16, configured to index the valid instances of the combined bandwidth and the related sets of coefficients in a table.

18. An apparatus for wireless communications, the apparatus comprising at least one processor, and at least one memory including computer program code, wherein the at least one memory and the computer program code are configured, with the at least one processor, to:

determine instances for combined transmission bandwidths from component bandwidths defining contiguously combined transmission bandwidths based on selection of configurations for the component bandwidths from a group of available bandwidth configurations and scaling of the instances for combined transmission bandwidths by applying coefficients to provide contiguous combined transmission bandwidths;

derive a channel bandwidth for a resource block unit based on the determined contiguously combined transmission bandwidths;

signal information associated with the combining of bandwidths, to at least one of: a mobile device and another enhanced NodeB; and communicate with a mobile device of the wireless network based at least on the information.

* * * * *